(12) United States Patent
Yoshino et al.

(10) Patent No.: US 8,753,419 B2
(45) Date of Patent: Jun. 17, 2014

(54) METHOD FOR TREATMENT OF CHROME-CONTAINING MOLTEN IRON AND SLAG

(75) Inventors: Takahiro Yoshino, Yamaguchi (JP); Masakazu Mori, Yamaguchi (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 13/583,844

(22) PCT Filed: Dec. 8, 2010

(86) PCT No.: PCT/JP2010/072052
§ 371 (c)(1),
(2), (4) Date: Sep. 10, 2012

(87) PCT Pub. No.: WO2011/121856
PCT Pub. Date: Oct. 6, 2011

(65) Prior Publication Data
US 2013/0025413 A1 Jan. 31, 2013

(30) Foreign Application Priority Data
Mar. 29, 2010 (JP) .................................. 2010-076300

(51) Int. Cl.
*C21C 5/54* (2006.01)
*C21C 7/064* (2006.01)

(52) U.S. Cl.
USPC ................................. 75/386; 75/568; 75/583

(58) Field of Classification Search
USPC ......................................... 75/568, 386, 583
See application file for complete search history.

(56) References Cited

FOREIGN PATENT DOCUMENTS

| GB | 2076858 A | * 12/1981 | ............... C21C 5/28 |
|---|---|---|---|
| JP | 2000-144272 | 5/2000 | |
| JP | 2001-049325 | 2/2001 | |
| JP | 2007-302961 | 11/2007 | |
| JP | 2008-063600 | 3/2008 | |
| JP | 2008063600 A | * 3/2008 | |
| JP | 2008-190015 | 8/2008 | |

OTHER PUBLICATIONS

Machine translation of JP 2008-063600 A by Fudaka et al, published Mar. 21, 2008.*
Machine translation of JP 2000-144272 A by Fujiwara et al., published May 2000.*
Tadanori Matsunami et al., "Toribe Funtai . . . no Kaihatsu", Current advances in materials and processes, vol. 7, No. 4, Sep. 1994, p. 1138.

* cited by examiner

*Primary Examiner* — George Wyszomierski
*Assistant Examiner* — Tima M McGuthry Banks
(74) *Attorney, Agent, or Firm* — Clark & Brody

(57) ABSTRACT

Chrome-containing molten iron and slag are to be obtained in an electric furnace operation using $CaF_2$-free slag. In order to reduce and collect chrome from the slag while simultaneously promoting desulfurization of molten iron, a chrome-containing molten iron produced in an electric furnace and having a Cr content of from 8.0 to 35.0% by mass, and a $CaF_2$-free electric furnace slag formed during the molten iron production, including $Cr_2O_3$, $SiO_2$ and CaO as the constituent components and having a basicity $CaO/SiO_2$ of from 0.7 to 1.7, are mechanically stirred with an impeller in a refining vessel. A metal Al-containing substance and CaO are put into the vessel before the end of stirring to thereby control the basicity of the slag after the end of stirring to at least 1.9

4 Claims, 3 Drawing Sheets

METHOD FOR TREATMENT OF CHROME-CONTAINING MOLTEN IRON AND SLAG

TECHNICAL FIELD

The present invention relates to a method for treatment of chrome-containing molten iron and slag for reducing and collecting Cr from slag into molten iron and promoting desulfurization of molten iron in a refining process of mechanically stirring chrome-containing molten iron produced in an electric furnace and electric furnace slag formed during the molten iron production, with mixing blades (impeller) in a refining vessel.

BACKGROUND ART

It is general that chrome-containing steel such as typically stainless steel is produced in a process including melting scrap and other materials in an electric furnace into a molten iron (in other words, it may be called to a molten pig iron) followed by refining it into a steel having a predetermined component composition. In producing a chrome-containing molten iron in an electric furnace, $Cr_2O_3$-containing slag is formed. In actual operation, in order to reduce the cost of chrome-containing steel, it is important to collect chrome from the electric furnace slag into the molten iron as much as possible to thereby increase the chrome yield rate in the steel.

Heretofore, in producing chrome-containing molten iron in an electric furnace, there has been employed a method of using $CaF_2$ as a flux component so as to increase the flowability of slag. Recently, however, in use of steel slag as a ground or roadbed material, the content of the fluorine ingredient therein has become restricted, and therefore utilization of $CaF_2$-free slag, or that is, slag not containing $CaF_2$ has increased in electric furnace operation. In that case, the melting point of slag rises and the flowability thereof lowers. In addition, the basicity of slag, $CaO/SiO_2$ lowers and the $SiO_2$ activity in slag tends to increase. For these reasons, as compared with $CaF_2$-incorporated slag, $CaF_2$-free slag has a problem in that chrome-reducing reaction according to the following formula (1) (the rightward reaction) is difficult to go on therein and therefore the chrome yield rate in molten iron tends to lower.

$$3[Si]+2(Cr_2O_3)=3(SiO_2)+4[Cr] \quad (1)$$

For promoting chrome reduction in slag, a method may be taken into consideration of adding a metal Al-containing substance to thereby promote the reduction reaction according to the following formula (2):

$$2Al+(Cr_2O_3)=(Al_2O_3)+2[Cr] \quad (2)$$

However, the melting point of $CaF_2$-free slag is high and the flowability thereof is low, and therefore in the slag of the type, the reaction of the formula (2) is difficult to promote sufficiently in the electric furnace process, and at present, the method could not be so much an effective countermeasure.

On the other hand, another method is known, which includes transferring chrome-containing molten iron produced in an electric furnace into another refining vessel along with slag thereinto, stirring it with inert gas blowing thereinto or with stirring with an impeller for chrome reduction and collection from slag (Patent References 1, 2). As a reducing agent, used is an Al or Si-containing substance, and the $Cr_2O_3$ content in the slag after stirring treatment is reduced to around 2.8 to 4.4% (Patent Reference 1, Nos. 1, 2, 4 and 5 in Table 1), or around 2.6 to 4.7% (Patent Reference 2, Examples in Table 3).

RELATED ART REFERENCES

Patent References

Patent Reference 1: JP-A-2000-144272
Patent Reference 2: JP-A-2001-49325

SUMMARY OF THE INVENTION

Problems to be Solved by the Invention

In chrome-containing steel such as typically stainless steel, except for only a part of special use, it is generally desired that the S content is reduced as much as possible. In some but many stainless steel types defined in JIS G4305:2005, the S content is accepted to be at most 0.030% by mass as a standard; however, many stainless steel products produced and sold by domestic manufacturers are high-quality steel products in which the S content is reduced to 0.010% by mass, and stainless steel in which the S-content is controlled to be at most 0.005% by mass or even to at most 0.001% by mass is not uncommon.

Electric furnace operation using $CaF_2$-incorporated slag provides an excellent desulfurization effect, in which, therefore it is relatively easy to reduce the S content in stainless steel. However, in electric furnace operation using $CaF_2$-free slag, the desulfurization effect is poor, and therefore it is necessary to increase the desulfurization load in the subsequent refining step for reducing the S content in stainless steel. The S content in electric furnace molten iron tends to increase in the case of using $CaF_2$-free slag, though the starting material used may have a great influence thereon. When the S content in chrome-containing molten iron is on a level of around at most 0.015% by mass, then the desulfurization load in steel-making, for example, in a VOD process or an AOD process could be reduced, and it could be easy to produce stainless steel in which the S content is at most 0.010% by mass. For obtaining low-S stainless steel having an S content of at most 0.005% by mass, it is advantageous to reduce the S content in the stage of molten iron to at most 0.010% by mass.

Accordingly, the present invention is to provide a means for reducing and collecting chrome from slag with simultaneously promoting desulfurization of molten iron, as directed to chrome-containing molten iron and slag to be obtained in electric furnace operation using $CaF_2$-free slag.

Means for Solving the Problems

The above-mentioned object can be attained by a method for treatment of chrome-containing molten iron and slag, comprising mechanically stirring a chrome-containing molten iron produced in an electric furnace and having a Cr content of from 8.0 to 35.0% by mass, and a $CaF_2$-free electric furnace slag formed during the molten iron production including $Cr_2O_3$, $SiO_2$ and CaO as the constituent components and having a basicity $CaO/SiO_2$ of from 0.7 to 1.7, with an impeller in a refining vessel, wherein a metal Al-containing substance and CaO are put into the vessel before the end of stirring to thereby control the basicity of the slag after the end of stirring to at least 1.9. As the metal Al-containing substance, for example, aluminium dross containing a metal Al in an amount of from 20 to 80% by mass is employable here.

As one typical candidate of molten iron (in other words, molten pig iron), there is mentioned a molten iron which is to be formed into stainless steel by another subsequent refining process. "Stainless steel" as referred to herein is defined as Number 3801 of JIS G0203:2009, and the steels include concretely austenitic steel types defined in Table 2 of JIS 64305:2005, austenitic ferritic steel types defined in Table 3 thereof, ferritic steel types defined in Table 4 thereof, martensitic steel types defined in Table 5 thereof, precipitation hardened steel types defined in Table 6 thereof; and in addition to these, other various types of developed steel not corresponding to JIS could also be applied in the invention. Within these, especially preferred are those having an S content of at most 0.010% by mass.

Advantage of the Invention

According to the invention, for chrome-containing electric furnace molten iron and slag obtained by the use of a $CaF_2$-free slag, reduction and collection treatment of chrome from slag into molten iron and desulfurization treatment of molten iron can be attained at the same time. Accordingly, the chrome yield rate reduction owing to the absence of $CaF_2$ in slag can be prevented and the increase in the desulfurization load in the subsequent step can also be prevented. In addition, the formed $CaF_2$-free slag can be reused in roadbed or ground materials, etc.

MODE FOR CARRYING OUT THE INVENTION

The chrome-containing molten iron to which the invention is directed for treatment is an electric furnace molten iron (in other words, molten pig iron; as the same hereinafter) for producing chrome-containing steel such as typically stainless steel. As a result of many laboratory experiments where various steel types of ferritic steel, austenitic steel, austenitic ferritic composite-phase steel were simulated, the effect of chrome reduction/collection and desulfurization was confirmed in applying the stirring treatment to be described below to a chrome-containing molten iron of which the Cr content is from 8.0 to 35.0% by mass. For the Si content, a relatively broad range of from 0.01 to 1.5% by mass or so is accepted. Regarding the S content, the desulfurization effect can be attained in a broad content range; however, in case where the S content after stirring treatment is at most 0.015% by mass, the S content before stirring treatment is preferably at most 0.05% by mass. For further reduction of S, the content before stirring treatment is more preferably at most 0.04% by mass. Regarding slag, in case where $CaF_2$-free electric furnace slag including $Cr_2O_3$, $SiO_2$ and CaO as the constituent components and having a basicity $CaO/SiO_2$ of from 0.7 to 1.7 is to be treated, a good result has been confirmed by applying thereto the stirring treatment to be described below.

The chrome-containing molten iron and slag as above can be obtained in ordinary electric furnace operation using a $CaF_2$-free slag.

The treatment of chrome-containing molten iron and slag in the invention includes mechanically stirring the above-mentioned electric furnace molten iron and electric furnace slag with an impeller in a refining vessel.

Figure 1:
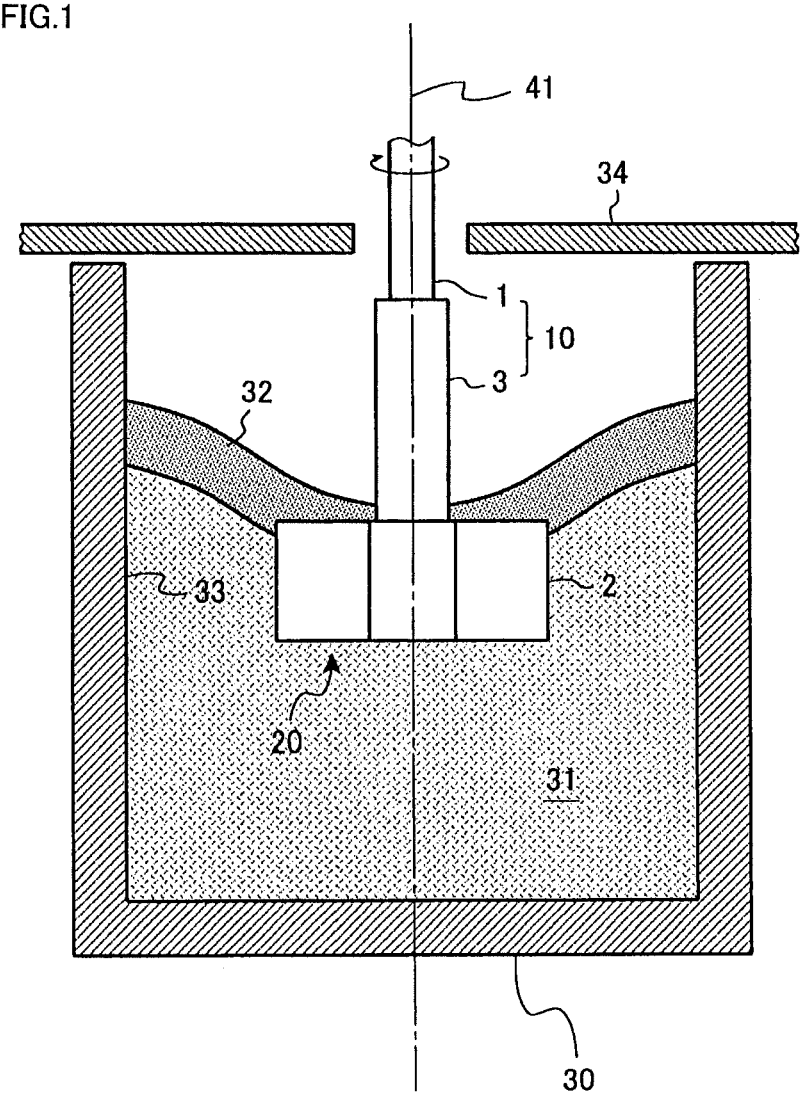
FIG. 1 is a partial cross-sectional view schematically showing the configuration of each part in a refining vessel in which chrome-containing molten iron and slag are mechanically stirred.

FIG. 1 schematically shows the configuration of each part in a refining vessel for mechanical stirring therein. This shows a cross section including rotation axis 41, in which, however, rotor 20 is shown as the side view thereof.

Chrome-containing molten iron 31 and slag 32 produced in an electric furnace are put into refining vessel 30, and mechanically stirred therein with impeller 2. The chrome-containing molten iron 31 and the slag 32 are obtained in one and the same electric furnace charge. In the embodiment of FIG. 1, the impeller 2 and axial rod 10 are integrated to constitute the rotor 20, and the rotor 20 rotates around the rotation axis 41 running in the vertical direction. The revolution speed could be, for example, from 50 to 150 rpm or so. Preferably, the refining vessel 30 for use herein is so designed that the horizontal cross section of inner wall 33 thereof is circular. The inner diameter of the refining vessel 30 may be uniform in the height direction or may not be uniform. For example, the refining vessel may be so designed that its inner diameter increases from the bottom toward the top thereof.

When the stirring with the rotor 20 is started, the molten material level of the fluid composed of the chrome-containing molten iron 31 and the slag 32 lowers in the central part but is high at the peripheral part. In FIG. 1, the molten material level fluctuation is overdrawn. With the rotation, the interface between chrome-containing molten iron 31 and the slag 32 may be complicated, but in FIG. 1, the interface is drawn in a simplified manner. The height position of the rotor 20 is so set that the top of the impeller 2 could sink below the molten material level during rotation. The upper open mouth of the refining vessel 30 is closed mostly with hood 34 except the area around the axial rod 10.

Figure 2:
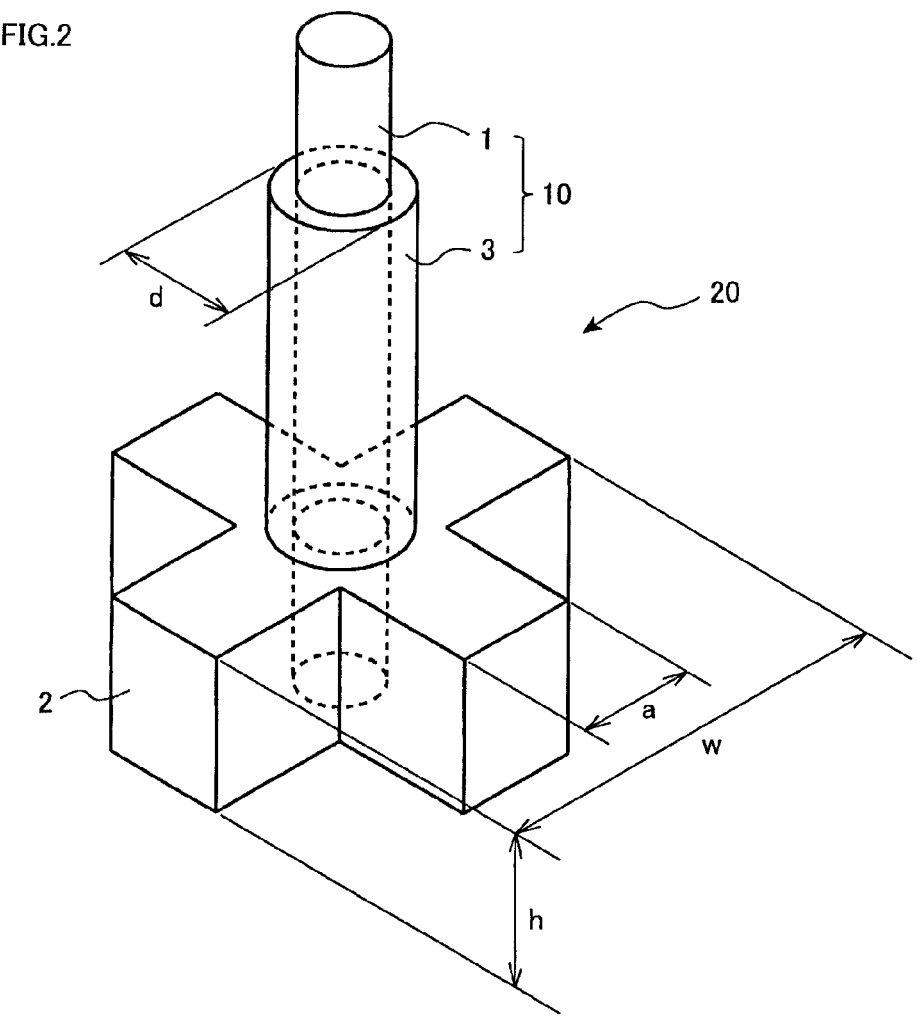
FIG. 2 is a view schematically illustrating the shape of a rotor for use for mechanical stirring in the initial state thereof.

FIG. 2 schematically illustrates the configuration of the rotor 20 in the initial state thereof (not worn). An impeller 2 is fitted to the lowest part of axial core 1 formed of a steel material or the like. Inside the impeller 2, in general, there exists a core material (not shown) formed of a steel material, as connected with the axial core 1, and the impeller 2 is constructed by covering the core material with a refractory using the core material as a substrate. Around the axial core 1, formed is a refractory layer 3 so as to protect the axial core 1 formed of a steel material or the like from being directly exposed to a molten material. An axial rod 10 is composed of the axial core 1 and the refractory layer 3 around it. Regarding the form thereof, the impeller 2 in the drawing has a uniform width W in the direction of the height h; however, any other form is employable here. For example, there is mentioned another form of the impeller 2 of which the width W is the largest at the top and is the smallest at the bottom thereof.

In mechanically stirring, a metal Al-containing substance is put into the vessel during the stage before the end of stirring. More preferably, the substance is put thereinto before the start of stirring or in a relatively early stage after the start of stirring. In case where a metal Al-containing substance is put into the vessel before the start of stirring, it may be put thereinto after electric furnace molten iron and slag have been transferred into the refining vessel. All may be put thereinto at a time, or may be put as divided portions. Metal Al serves as a reducing agent, and contributes toward chrome reduction of the above formula (2) during stirring. As the metal Al-containing substance, usable here is a pure aluminium ingot or an aluminium alloy ingot, but use of "aluminium dross" to be formed in melting factories for aluminium bare metal or aluminium scrap is economical. Especially preferred is use of aluminium dross containing metal Al in an amount of from 20 to 80% by mass. Metal Al could contribute toward chrome reduction even though its amount added is small; however, when the amount thereof added is too small, the metal could not sufficiently exhibit the effect thereof. On the other hand, adding too much is unfavorable since the Al content in the molten iron would be excessive. The amount of the metal Al-containing substance to be added may be determined depending on the ($Cr_2O_3$) content in the electric furnace slag and the [Si] content in the chrome-containing molten iron. As a result of various investigations, it is preferable to put a metal Al-containing substance into the vessel in an amount of from 0.05 to 2.0 kg in terms of the metal Al-equivalent amount thereof, per ton of molten iron.

In the invention, desulfurization of molten iron is promoted simultaneously with reduction and collection of chrome. As the desulfurizing agent, use of CaO that is a slag component is most effective. The desulfurization reaction with CaO goes on according to the following formula (3):

$$(CaO)+[S]=(CaS)+[O] \quad (3)$$

The resulting oxygen forms an oxide with Si and Al in the molten iron to be a slag component.

CaO may be contained in electric furnace slag, but the basicity of the slag to which the invention is directed is from 0.7 to 1.7. According to the investigations made by the present inventors, it has been found that, when the stirring treatment condition is so controlled that the basicity of the slag could be finally at least 1.9, then the S content in the molten iron could be reduced to 0.015% by mass or so, or even to a lower level than it. For attaining further reduction of S, it is desirable that the basicity of slag after the stirring is controlled to be at least 2.0, more preferably at least 2.1. However, when the basicity is too high, then the cost performance relative to desulfurization would lower. In general, the basicity of slag after stirring may be controlled to fall within a range of at most 3.0. For basicity control, CaO must be newly added to the system. Regarding the time for addition thereof, CaO must be added before the end of mechanical stirring, but like the metal Al-containing substance, it is more desirable that CaO is put into the vessel before the start of stirring or in a relatively early stage after the start of stirring. In case where CaO is put into the system before the start of stirring, it may be put into an electric furnace, or may be put into the refining vessel after electric furnace molten iron and slag have been transferred thereinto. All the necessary amount may be put thereinto at a time, or may be put as divided portions.

The necessary amount of CaO for controlling the basicity of slag after stirring to be at least 1.9, preferably at least 2.0 may be determined depending on the parameters having some influence on desulfurization, such as the S content in molten iron before treatment, the Si content and the basicity of slag before treatment. For example, "the relationship between various parameters having influence on desulfurization and appropriate amount of CaO to be added" is previously compassed in preliminary experiments, and in the actual manufacture site, employable is a method of determining the optimum amount of CaO to be added through checking with the experimental data.

The temperature of the molten iron during mechanical stirring can be from 1350 to 1550° C. or so. The stirring time may be set to fall within a range of approximately from 360 to 900 seconds, and for example, the time may be controlled to fall within a range of from 480 to 720 seconds.

The molten iron thus having been mechanically stirred in a refining vessel and having been processed for chrome reduction/collection and desulfurization can be used in any ordinary stainless steel production process such as a VOD method, an AOD method or the like.

EXAMPLES

In a stainless steel manufacturing site, experiments for confirming the effect of the invention were carried out. In this, an experiment of using a steel melting charge for producing SUS430-type ferritic stainless steel is exemplified.

A molten iron was produced in an electric furnace at a rate of about 80 ton/charge. In this, the slag was a $CaF_2$-free one. The mean content of C, Si, Cr and S in the chrome-containing molten iron produced in the electric furnace (molten iron before treatment) and the distribution range thereof as well as the basicity of the slag formed during the electric furnace iron production (slag before treatment) are shown in Table 1.

TABLE 1

| | | Mean Value | Distribution Range |
|---|---|---|---|
| Data of Components of Chrome-Containing Molten Iron before stirring treatment | [% C] | 3.34 | 2.96-3.60 |
| | [% Si] | 0.24 | 0.04-0.47 |
| | [% Cr] | 17.13 | 15.42-18.44 |
| (% by mass) | [% S] | 0.021 | 0.013-0.035 |
| Basicity of Slag before stirring treatment | (% CaO)/ (% $SiO_2$) | 1.20 | 0.91-1.47 |

The chrome-containing molten iron and the slag produced in the electric furnace were transferred into a refining vessel (inner diameter, about 2760 mm) having a cylindrical inner face. A rotor of the type shown in FIG. 2 was installed into the refining vessel. The dimension of the rotor was, in FIG. 2, as follows: a=about 600 mm, h=about 700 mm, W=about 1200 mm, d=about 550 mm. The rotor installation height was so controlled that, as the molten material level before rotation, the top of the impeller 2 could sink down to be lower than the slag/molten iron interface.

As a reducing agent, aluminium dross having a metal Al content of about 35% by mass was prepared here. A stirring charge with aluminium dross put into the vessel, and a stirring charge with no aluminium dross were carried out. In every former charge, the amount of aluminium dross put into the vessel was 0.4 kg/ton of molten iron, and all the dross was put thereinto before the start of stirring. The amount of the aluminium dross put into the vessel per ton of the molten was converted into the metal Al-equivalent amount thereof, which was 0.4 kg×0.35=0.14 kg. CaO serving as a desulfurizing agent was added to every charge. The amount of CaO added per ton of the molten metal was 2.7 kg, 6.5 kg or 13.0 kg. All the agent was added before the start of stirring. The mechanical stirring condition was: a revolution speed of from 80 to 120 rpm and a stirring time of 600 seconds. The molten iron temperature after stirring of every charge fell within a range of from 1296 to 1397° C., and the mean temperature was 1344° C.

Figure 3:
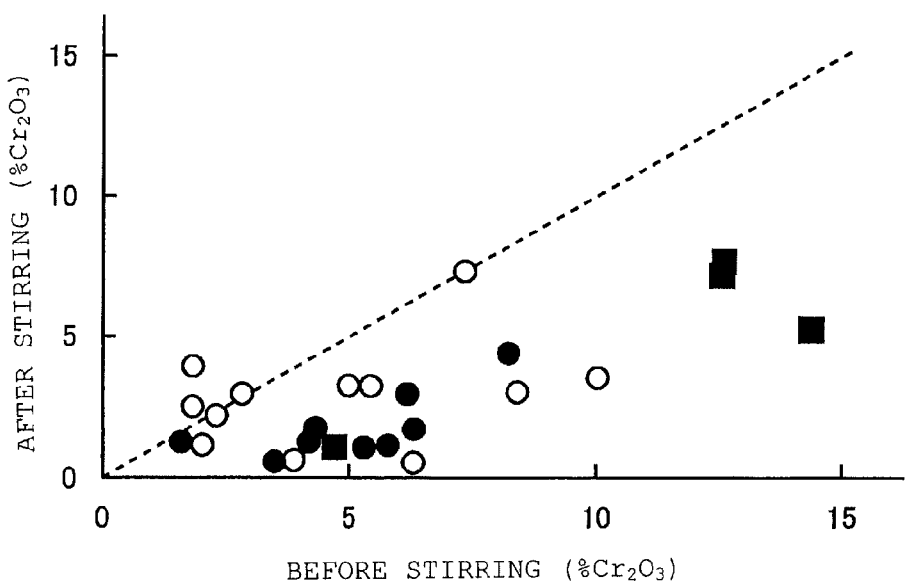
FIG. 3 is a graph in which is plotted the $Cr_2O_3$ content in slag before stirring and after stirring in each stirring charge demonstrated in Examples.

In FIG. 3, plotted was the $Cr_2O_3$ content (% by mass) in the slag before stirring and after stirring in each stirring charge. The meanings of the plot marks are as follows:

○: Amount of CaO added, 2.7 kg/ton, with no metal Al addition
●: Amount of CaO added, 6.5 kg/ton, amount of metal Al added, 0.14 kg/ton ■: Amount of CaO added, 13.0 kg/ton, amount of metal Al added, 0.14 kg/ton In every charge where metal Al was added (plotted as ● and ■), it has been confirmed that chromium reduction and collection from slag is possible by mechanical stirring.

Figure 4:
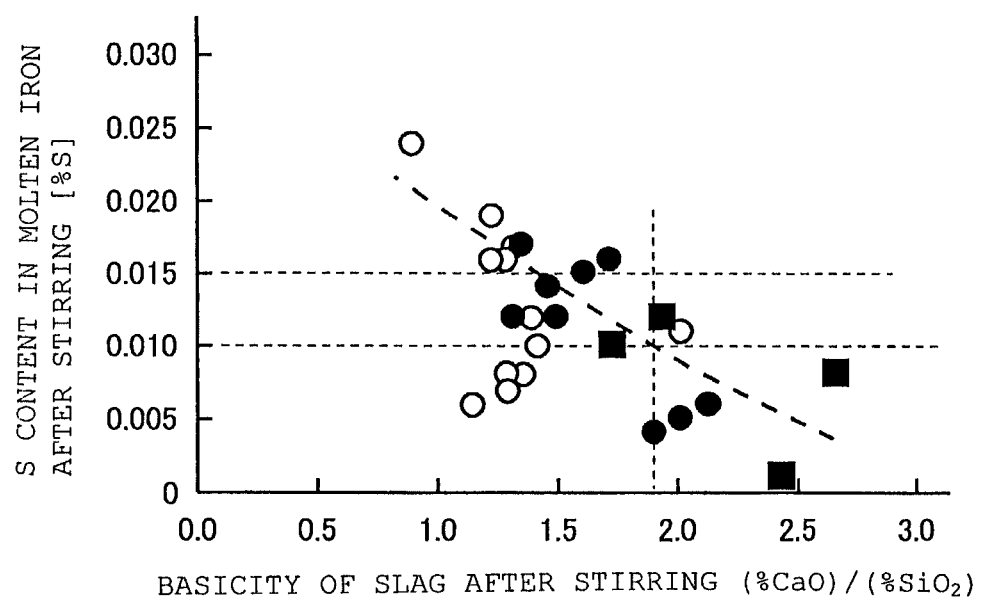
FIG. 4 is a graph in which is plotted the relationship between the basicity of slag (% CaO)/(% $SiO_2$) after stirring and the S content [% S] in molten iron after stirring in each stirring charge demonstrated in Examples.

FIG. 4 shows the relationship between the basicity of the slag (% CaO)/(% $SiO_2$) after stirring and the S content [% S] in the molten iron after stirring in each stirring charge. The meanings of the plot marks are the same as above. As seen from FIG. 4, when the basicity of slag after stirring is high, then the desulfurization during stirring is promoted. In order that the S content in the molten iron could be stably on the level of at most 0.015% by mass, it is effective that the basicity of the slag after stirring is at least 1.9, but preferably at least 2.0.

DESCRIPTION OF REFERENCE NUMERALS

1 Axial Core
2 Impeller
3 Refractory Layer
10 Axial Rod
20 Rotor
30 Refining Vessel
31 Chrome-Containing Molten Iron
32 Slag
33 Inner Wall
34 Hood
41 Rotation Axis

The invention claimed is:

1. A method for treatment of chrome-containing molten iron and slag,

Comprising mechanically stirring a chrome-containing molten iron produced in an electric furnace and having a Cr content of from 8.0 to 35.0% by mass, and a Ca F2-free electric furnace slag formed during the molten iron production including $Cr_2O_3$, $SiO_2$ and CaO as constituent components and having a basicity CaO/$SiO_2$ of from 0.7 to 1.7, with an impeller in a refining vessel, wherein a metal Al-containing substance, which is a reducing agent of $Cr_2O_3$, and CaO are put into the vessel before the end of stirring to thereby control the basicity of the slag after the end of stirring to at least 1.9.

2. The method for treatment of chrome-containing molten iron and slag as claimed in claim 1, wherein the metal Al-containing substance is aluminum dross containing a metal Al in an amount of from 20 to 80% by mass.

3. The method for treatment of chrome-containing molten iron and slag as claimed in claim 1, wherein the basicity of the slag after the end of stirring is controlled to from 1.9 to 3.0.

4. The method for treatment of chrome-containing molten iron and slag as claimed in claim 1, wherein the basicity of the slag after the end of stirring is controlled to from 2.0 to 3.0.

* * * * *